US012535308B1

United States Patent
Murnane

(10) Patent No.: US 12,535,308 B1
(45) Date of Patent: Jan. 27, 2026

(54) RECOVERY SYSTEM FOR HIGH PERFORMANCE LARGE BORE PROJECTILES

(71) Applicant: U.S. Government as Represented by the Secretary of the Army, Dover, NJ (US)

(72) Inventor: James F. Murnane, Hackettstown, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 18/884,328

(22) Filed: Sep. 13, 2024

(51) Int. Cl.
*F42B 10/56* (2006.01)
*B64D 17/00* (2006.01)
*F42B 8/12* (2006.01)
*F42B 4/12* (2006.01)
*F42B 4/28* (2006.01)

(52) U.S. Cl.
CPC .............. *F42B 10/56* (2013.01); *B64D 17/00* (2013.01); *F42B 4/12* (2013.01); *F42B 4/28* (2013.01); *F42B 8/12* (2013.01)

(58) Field of Classification Search
CPC ...... F42B 4/12; F42B 4/28; F42B 8/12; F42B 10/56; F42B 10/58; B64D 17/00
USPC ................ 102/293, 348, 354, 473, 498, 529
See application file for complete search history.

(56) References Cited

U.S. PATENT DOCUMENTS 1,150 A 5/1839 Williams, Jr.
1,534 A 3/1840 Treadwell
3,478,687 A * 11/1969 Craig ...................... F42B 12/42 102/354
4,002,064 A 1/1977 Curchack et al.
4,300,389 A 11/1981 Tevelow
4,345,460 A 8/1982 Curchack et al.
H776 H * 5/1990 Cole ........................ F42B 10/54 102/388
H1150 H * 3/1993 Fritch ............................ 102/293
5,220,128 A * 6/1993 Grau ........................ F42B 10/06 102/293
H1534 H * 6/1996 Fritch ............................ 102/354
6,782,829 B1 * 8/2004 Han ........................ F42B 10/56 102/504
8,006,936 B1 * 8/2011 Farr, III ................. B64G 1/002 244/151 B
(Continued)

*Primary Examiner* — James S Bergin
(74) *Attorney, Agent, or Firm* — David J. Torrente

(57) ABSTRACT

A ballistic projectile recovery system includes a forward opening in an ogive of the projectile, selectively opened to deploy a portion of the recovery system. A parachute is deployable through the opening, connected to the projectile by riser line(s). A rotational bearing assembly makes the riser line(s) rotationally decoupled from the projectile. A bidirectional drag inducing element extends externally of an ogive of the projectile. A spacer, between a setback plate and the rotational bearing assembly, is deformable in at least the longitudinal direction of the projectile. The setback plate is movable between a first position to a second position made available by the compression of the spacer. In the second position, the setback plate is in contact with the projectile, providing a load path that avoids the rotational bearing assembly to take up strain applied to the projectile in at least the longitudinal direction.

13 Claims, 5 Drawing Sheets

(56) References Cited

U.S. PATENT DOCUMENTS

| | | | | |
|---|---|---|---|---|
| 11,326,862 | B2 * | 5/2022 | Trouillot ................ | B64D 17/76 |
| 2008/0289530 | A1 * | 11/2008 | Adorjan .................. | F42B 12/42 362/253 |

* cited by examiner

-PRIOR ART-

RECOVERY SYSTEM FOR HIGH PERFORMANCE LARGE BORE PROJECTILES

STATEMENT OF GOVERNMENT INTEREST

The inventions described herein may be manufactured, used and licensed by or for the United States Government.

BACKGROUND OF THE DISCLOSURE

Field of the Disclosure

The present disclosure relates to the field of munitions, and more particularly to an apparatus and method for the intact recovery of projectiles fired from high performance, long range, and/or large bore artillery weapon systems.

Brief Description of Related Art

In parallel with the development of more powerful ballistic artillery launch platforms, the munitions themselves are likewise are becoming more potent and technologically advanced. Among the areas of advance, many launch packages now include increasingly varied and sophisticated electronics. These launch packages must be tested and verified as able to survive the firing environment, and thereafter function as intended, withstanding the extreme temperature, pressure and acceleration forces imposed on them throughout the ballistic launch process. Such launch stresses upon the munitions are further exacerbated by the increased performance weapons. Therefore, samples of fired munitions must be recovered, intact, for post-firing examination.

One solution to the described problem is disclosed, for example, by U.S. Statutory Invention Registration No. H1150 by Fritch (hereinafter, "Fritch '150"), published 2 Mar. 1993. By this reference, the complete contents of Fritch '150 are hereby incorporated herein in their entirety as if set out in full, and for all purposes. The system according to Fritch '150 is also known as the Soft-Recovery Parachute Module, or "SRPM".

As set forth by Fritch '150, with reference to FIG. 5 (a duplication of Fritch '150, FIG. 1): "[T]here is shown the preferred embodiment of the nose-deployed parachute recovery system of the present invention generally designated as projectile 2 which is fired from rifled cannon 1 in a nearly vertical trajectory where drag and gravitational forces slow down the projectile 2 until it reaches its highest point or apogee in its trajectory. Thereafter, the spin stabilized projectile 2 starts to fall back to earth in a nose up attitude. After several seconds of free fall, a time fuze (not shown here) within fuze assembly 11 (FIG. 5) initiates an expulsion charge 26 which generates gas pressure that causes a parachute assembly such as 5 (FIG. 2) to be deployed from the parachute module 30, for instance. The main parachute 14 provides a low velocity, soft landing for the projectile payload 20. The base 4 of the nose-deployed parachute module 30 has a threaded section 9 for attachment to the payload 20."

More specifically, being a spin-stabilized projectile 2 fired from a rifled cannon 1, the continued spinning of the payload 20 as it descends under the canopy of the parachute 6 will eventually twist the suspension lines 8 upon themselves, collapsing the canopy, and leaving the payload 20 to be damaged upon ground impact. Therefore, the lines 8 and canopy 6 are decoupled from the payload 20 by rotary bearing 15, generally ensuring the canopy 6 remains open and inflated until the payload 20 touches down.

The SRPM system as generally described is qualified with 39 caliber Howitzer systems; "caliber" in this instance meaning barrel length as multiples of bore diameter. Therefore, a 39 caliber barrel having a 155 mm bore would imply a working barrel length of slightly greater than 6 meters. By comparison, certain artillery platforms extend the barrel to 58 caliber, i.e., 9 meters, with an accompanying increase in internal firing pressure and projectile muzzle velocity.

Testing of existing SRPM technology was conducted under the latter firing conditions, resulting in repeated failure of the rotary bearing 15. Following rotary bearing 15 failure, the lines 8 were no longer decoupled from the payload 20, and continued payload 20 spin either collapsed the canopy 6, or simply tore the lines 8 off. By way of reference, a launch package that is gyroscopically stabilized for flight would tend to rotate at a speed on the order of single-digit hundreds of hertz (Hz), for example ~300±Hz. After collapse and/or separation of the parachute canopy 6, the payload 20 impacted the ground at supersonic velocity. The payload 20 was either destroyed or had any internal data integrity severely compromised by the impact. Accordingly, the SRPM is inadequate for projectile recovery in such a launch environment.

BRIEF SUMMARY OF THE DISCLOSURE

In order to overcome these and other short comings in the known art, provided according to the present disclosure is a ballistic projectile recovery system including a generally forward-facing opening in an ogive of the projectile. The opening is selectively opened to deploy at least a portion of the recovery system. A parachute is deployable through the forward-facing opening and is connected to the projectile by one or more riser lines. A rotational bearing assembly, oriented coaxially with a longitudinal axis of the projectile, makes the one or more riser lines rotationally decoupled from the projectile. A bidirectional drag inducing element extending externally of an ogive of the projectile.

In a more particular embodiment, the bidirectional drag inducing element is rigidly affixed to the ogive of the projectile. Alternately or additionally, the bidirectional drag inducing element is extensible radially beyond the caliber of the projectile. In a more particular embodiment, the bidirectional drag inducing element being continuous around a circumference of the projectile. Alternately or additionally, the bidirectional drag inducing element is connected with the projectile forward of a center of gravity of the projectile. Certain embodiments of the ballistic projectile recovery system include the rotational bearing assembly having first and second taper bearings, with the first taper bearing being oriented in an opposite longitudinal direction from the second taper bearing.

Provided according to an alternate embodiment of the present disclosure is a ballistic projectile recovery system having a generally forward-facing opening in an ogive of the projectile which is selectively opened to deploy at least a portion of the recovery system. A parachute is deployable through the forward-facing opening and is connected to the projectile by one or more riser lines. A rotational bearing assembly is oriented coaxially with a longitudinal axis of the projectile. The one or more riser lines are rotationally decoupled from the projectile through the rotational bearing assembly. A spacer between a setback plate and the rotational bearing assembly is deformable in at least the longitudinal direction of the projectile.

In a more particular embodiment of the ballistic projectile recovery system the spacer comprises one or more spring washers. Alternately or additionally, the ballistic projectile recovery system includes the setback plate being movable between a first position wherein the spacer in uncompressed, to a second position made available to the setback plate by the compression of the spacer. In the second position of the setback plate, the setback plate is in contact with the projectile, thereby providing a load path that avoids the rotational bearing assembly to take up strain applied to the projectile in at least the longitudinal direction. Alternately or additionally, the rotational bearing assembly has at least one outer race affixed to a fixture of the ballistic projectile recovery system, the second position of the setback plate places the setback plate in contact with the fixture of the ballistic projectile recovery system.

In a more particular embodiment of the ballistic projectile recovery system the one or more riser lines are connected to the rotational bearing assembly via a rotary pin. In such an embodiment, the aforementioned spacer may be disposed around the rotary pin. More particularly, the rotary pin may be engaged with the rotational bearing assembly by a press fit. In a still more specific embodiment, the rotational bearing assembly has first and second taper bearings. In that case, first taper bearing may be oriented in an opposite longitudinal direction from the second taper bearing.

BRIEF DESCRIPTION OF DRAWINGS

These and other features, benefits, and advantages of the present disclosure will be made apparent with reference to the following detailed description, appended claims, and accompanying figures, wherein like reference numerals refer to like structures across the several views, and wherein:

It will be noted that, although particular sizes, dimensions and/or calibers may be discussed at certain points herein with respect to exemplary embodiments of the present disclosure, the drawings are not necessarily to scale.

DETAILED DESCRIPTION OF THE DISCLOSURE

Figure 1:
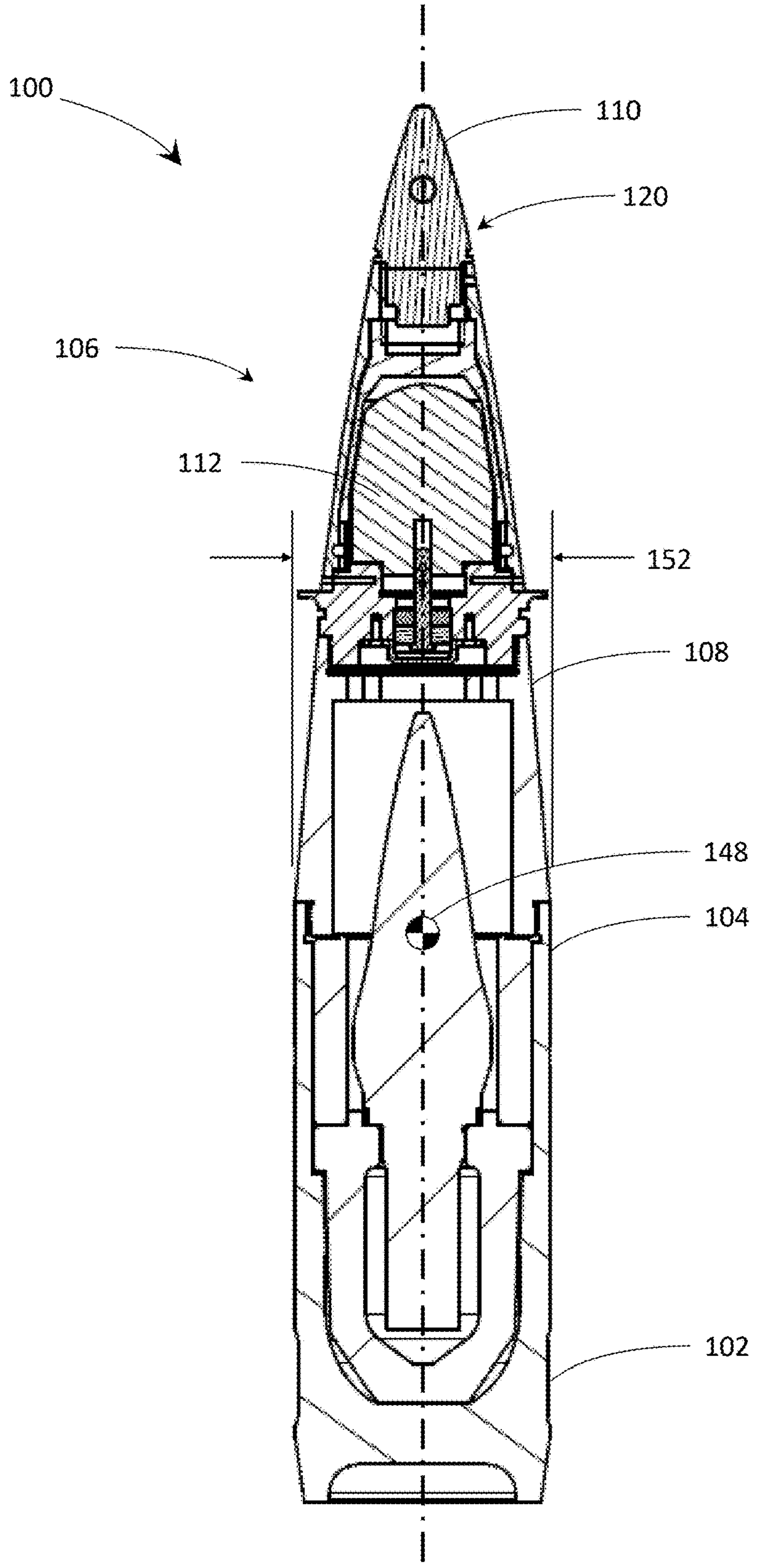
FIG. 1 illustrates a test article launch package according to the instant disclosure in an elevational view taken through a longitudinal cross-section.

Referring now to FIG. 1, illustrated is a test article launch package, generally 100, according to the instant disclosure. The test article launch package 100, in the example embodiment depicted, includes a clearly identifiable driving band 102, which is driven to engage with the helical rifling grooves of the cannon barrel by the expansion of the propellant gasses which are ignited to fire the launch package 100. By engagement of the driving band 102 with the rifling grooves of the cannon barrel, a spin is imparted to the launch package 2 which will gyroscopically stabilize the launch package 100 in flight.

For testing purposes, the launch package 100 may include a suite of sensors and data logging electronics, among other components. Often, it is of threshold interest whether a payload 104 of the launch package 100 is fit to survive the temperature, pressure and acceleration forces imposed upon them by the higher-pressure firing conditions. In addition to temperature, pressure and acceleration sensors, other sensing and/or data capture parameters may also be included. The launch data of interest is recorded by an on-board data recording apparatus, which make up at least part of the payload 104 contained within and launched with the launch package 100. This sensor package and on-board data recording apparatus launched from the weapon platform with the launch package 100 will be recovered for post-firing examination and analysis. The launch package 100 is further fitted with a recovery system to make that recovery possible and/or feasible.

Figure 2:
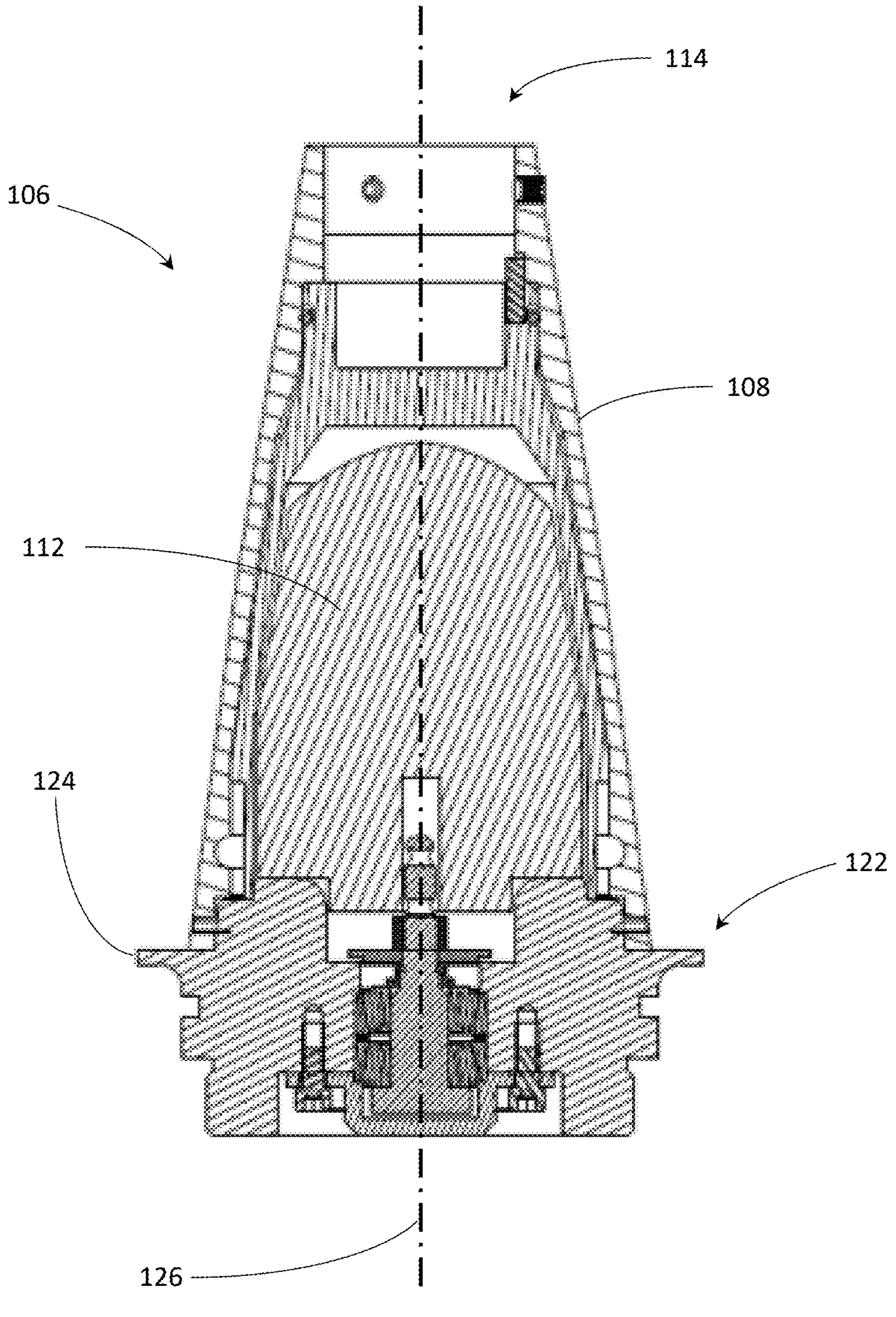
FIG. 2 illustrates a view of the High Performance Soft Recovery System according to the present disclosure, also in an elevational view taken through a longitudinal cross-section, being isolated from the remainder of the launch package.
Figure 3:
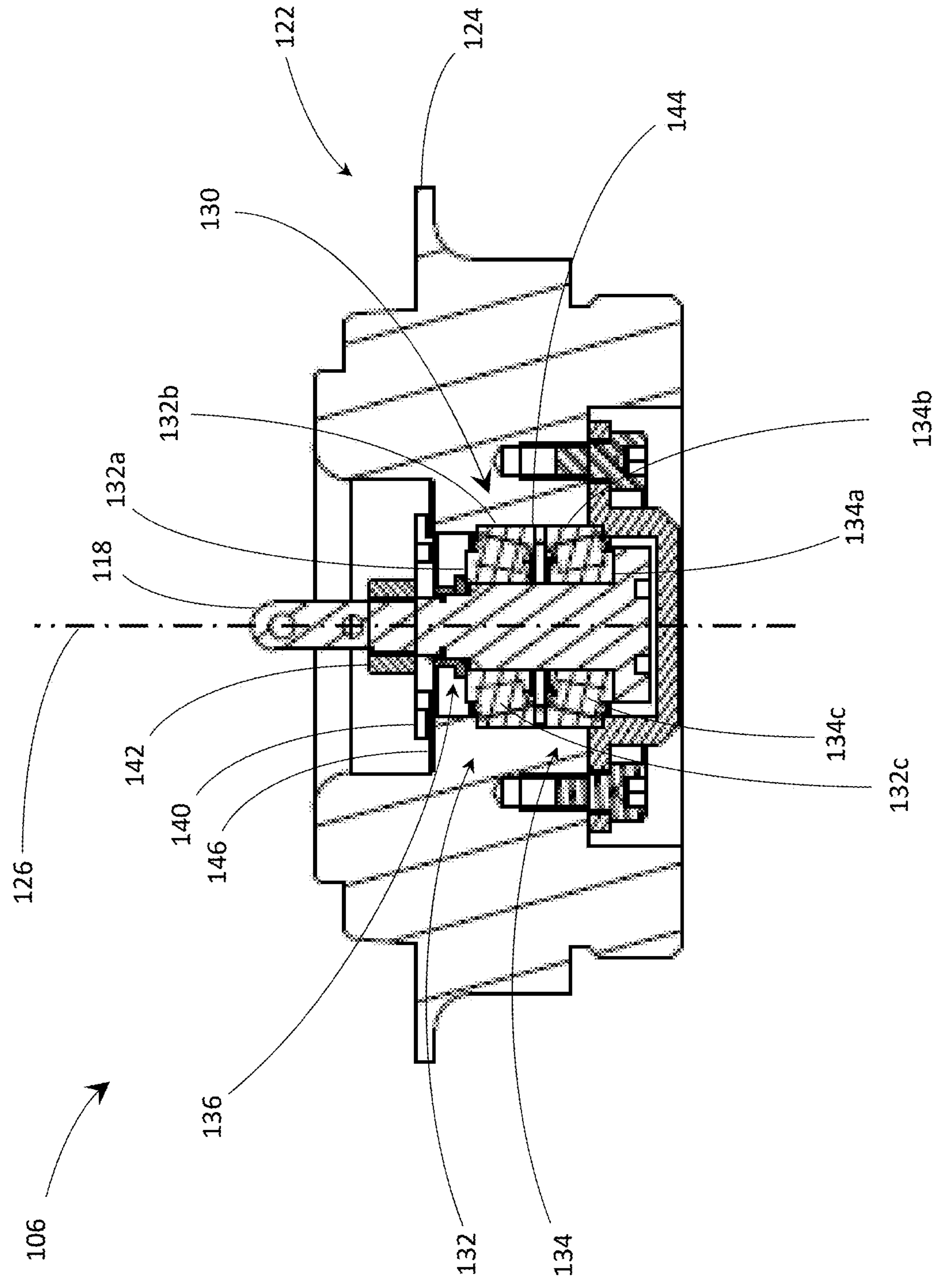
FIG. 3 illustrates the High Performance Soft Recovery System in longitudinal cross-section.

Presently disclosed is a High Performance Soft Recovery System ("HPSRS") 106. The HPSRS 106 replaces the ogive 108 of the launch package 100. FIG. 2, illustrates a perspective view of the HPSRS 106, separated from the remainder of the launch package 100. FIG. 3 illustrates the HPSRS 106 in longitudinal cross-section, with particular focus upon the attachment between the HPSRS 106 and riser lines 116 connecting the HPSRS 106, and thus the launch package 100, with a parachute 112. The following description of the HPSRS 106 may refer to one or more of FIGS. 1-3 interchangeably, as the context will readily admit.

The HPSRS 106 includes a detachable nose 110. A fuze 120 is carried with the HPSRS 106, in this instance consolidated with and/or attached to the detachable nose 110. After the launch package 100 passes an apogee of its flight, the fuze 120 initiates a brief delay, in one embodiment on the order of approximately 5-seconds, to the ignition of a pyrotechnic pressurization charge 150 beneath the detachable nose 110. The pyrotechnic pressurization charge 150 will be sufficient to separate the nose 110 from the HPSRS 106, but not impart damage to any part of the HPSRS 106, particularly not the parachute 112 or riser lines 116, nor to the payload 104. In one exemplary embodiment, this pressurization charge 150 may comprise on the order of approximately 10 g of ordinary black powder. The exact amount and formulation of the pressurization charge 150 may be varied by those skilled in the art without departing from the scope and substance of the instant disclosure.

The nose 110 will be attached to a parachute 112, for example via tether 128. The momentum of separation of the detachable nose 110 following the ignition of the pressurization charge, and/or the airstream drag acting upon the nose 110, which trails the HPSRS 106 as the launch package 100 descends post-apogee, acts to extract a parachute 112 from the HPSRS 106, which exits the HPSRS 106 via a forward opening 114 left by the separation of the nose 110. The parachute 112 is connected with the payload 104 by riser lines 116 that pass through the forward opening 114 to a central pin 118. The central pin 118 is mounted for free rotation relative to the remainder of the launch package 100 via bearing assembly 130. The parachute 112 and riser lines 116 are thus decoupled in rotation from the spinning payload 104 while the launch package 100 descends under the parachute 112 canopy.

With particular reference to the longitudinal cross-section depicted in FIG. 3, the HPSRS 106 connects the payload 104 to the parachute 112 via the central pin 118 and the bearing assembly 130. The bearing assembly 130 is, in this embodiment, comprised of matching duplex tapered roller bearings, configured face-to-face, namely a forward taper bearing 132, and an aft taper bearing 134. Each of the forward and aft taper bearings 132, 134 have a respective inner race 132*a*, 134*a*, a respective outer race 132*b*, 134*b* and respective sets of bearing rollers 132*c*, 134*c* therebetween, as is generally known. The central pin 118 may be mated to each of the inner races, 132*a*, 134*a*, with a press fit engagement, more particularly a light press fit, though other mating arrangements are possible.

The bearing assembly 130, including the forward taper bearing 132 and aft taper bearing 134, is operative to decouple the payload 104 from the central pin 118 in rotation around the longitudinal axis 126. Each taper bearing 132, 134 is operative to decouple in a specific axial direction. In this embodiment, the forward taper bearing 132 takes up axial loads on the central pin 118 in the aft direction, for example as applied by the payload 104. The aft taper bearing 134 takes up axial loads applied to the central pin 118 in the forward direction, for example as applied by the riser lines 116. The axial load-bearing direction of the forward and aft taper bearings 132, 134 may be reversed, such as by interchanging the relative location of each taper bearing relative to the other, without departing from the scope of the present disclosure.

Upon descent under the canopy of the parachute 112, the payload 104 may experience angular motion due to aerodynamic loads incurring an angle of attack of the payload 104. This angle of attack will impose off-axis loading conditions on the bearing assembly 130. The duplex bearing configuration of bearing assembly 130 provides a stiffer assembly and an increased load capacity, with longer life. Considering the bearing assembly 130 in a clockwise polar coordinate orientation, that is from a viewpoint generally aligned with longitudinal axis 126, an angle of attack imposing a normal force component in one particular quadrant, e.g., quadrant I, along the length of the cylindrical roller of the forward taper bearing 132, will concurrently impose a normal force in corresponding quadrant IV along the length of the cylindrical roller of the aft taper bearing 134. Concurrently, the forward and aft bearing rollers 132*c*, 134*c*, in the quadrants II and III have their normal forces diminished, and thus the rolling friction accordingly. This sharing of the off-axis force between the forward and aft taper bearings 132, 134 increases the robustness of bearing assembly 130.

In a more particular embodiment, the bearing assembly 130 is provided with a deformable spacer 136. In one embodiment, the deformable spacer 136 may comprise a pair of opposing spring washers located around the central pin 118 and between the forward taper bearing 132 and a setback plate 140. However, in other embodiments, such as the one depicted in FIG. 3, other configurations and choice of material, such as a collar having elastic properties can substitute for the spring washer to comprise the deformable spacer 136. The deformable spacer 136 can absorb a rearward axial load, for example on the central pin 118, as may be exerted due to inertial forces when the launch package 100 is fired from the cannon. Additionally, a setback plate 140 spans the through opening 144 that accommodates and receives the bearing assembly 130. A limit collar 142 is fixed to the central pin 118, for example by being threaded thereon. In response to a rearward axial load upon the central pin 118, the deformable spacer 136 compresses to absorb deflection in the aft direction. Simultaneously, the limit collar 142 bearing on the setback plate 140 provides an alternative load path, into the HPSRS 106 around the through opening 144. The alternative would place excess load on the forward taper bearing 132, and particularly its inner race 132*a*. Deflection or stress due to strain in the forward taper bearing 132 may be transmitted to or through the aft taper bearing 134, The ogive 108 of the HPSRS 106 is further provided with a longitudinal drag element 122. In this embodiment, the longitudinal drag element is a flange 124 that extends roughly perpendicular to a longitudinal axis 126 of the launch package 100. In the depicted embodiment, the flange 124 extends from the surface of the ogive 108 forward of the payload 104, i.e., toward the nose 110 along a longitudinal axis 126. The nature of the ogive 108, reducing in diameter in the direction of the nose 110, is such that this placement gives a radial clearance between, for example, the drag element base 146, where the drag element 122 connects with the ogive 108, and the driving band 102 which roughly corresponds with the internal bore dimension 152 of the cannon. The farther advanced towards the nose 110, the more clearance from the bore, and thus the more proud, or above the surface of the ogive 108, the flange 124 may extend while remaining within the dimension 152 of the cannon bore. The drag element 122 will preferably have an aerodynamic effect upon the launch package throughout its flight, and in both longitudinal directions, as described hereinafter.

In an alternate embodiment, the drag element 122 may articulate from a pre-launch position to a post-launch position. For example, in one such embodiment, the lateral extent of the drag element 122 could be constrained by the dimension 152 of the cannon bore. After the launch package 100 is fired, and is free of the cannon, the drag element 122 extends to an in-flight position. It is contemplated that the in-flight position of the drag element 122 in such an embodiment may extend to a diameter that is greater than dimension 152 and a pre-firing diameter than the launch package 100, which may be termed in certain applications a "super-caliber" diameter and/or dimension.

In the exemplary embodiment, depicted, the drag element 122 is continuous around a circumference of the ogive 108. In yet another alternative embodiment, the drag element may be formed with certain regular or irregular circumferential discontinuities. This may be particularly so in those embodiments having an articulating drag element 122 as described above, and/or those including a super-caliber diameter drag element 122.

Certain operational use cases for the HPSRS 106 will now be described. The HPSRS 106 is designed to facilitate the successful recovery of the launch package 100 intact post-firing. As a matter of convenience, the cannon barrel firing the launch package 100 including an HPSRS 106 is directed at an elevated angle above horizontal, for example at least about 40° up to and including about 87°. The choice of angle for launch is made in light of considerations including the precise impulse of the firing propelling the launch package 100, prevailing meteorological conditions, and the desire to ensure, to the extent possible, that upon landing the payload 104 will not enter a minimum safe area surrounding the launch location and its required attendant personnel. With likewise considerations, although launch conditions are generally predictable, i.e., the flight profile of a flight package 100 can generally be determined in advance with considerably certainty, it is often desirable to fire one or more spotter round(s), which are tracked with precision by surveillance radar. Accordingly, altitude of the spotter round(s) and the test rounds can be determined with certainty.

Figure 4:
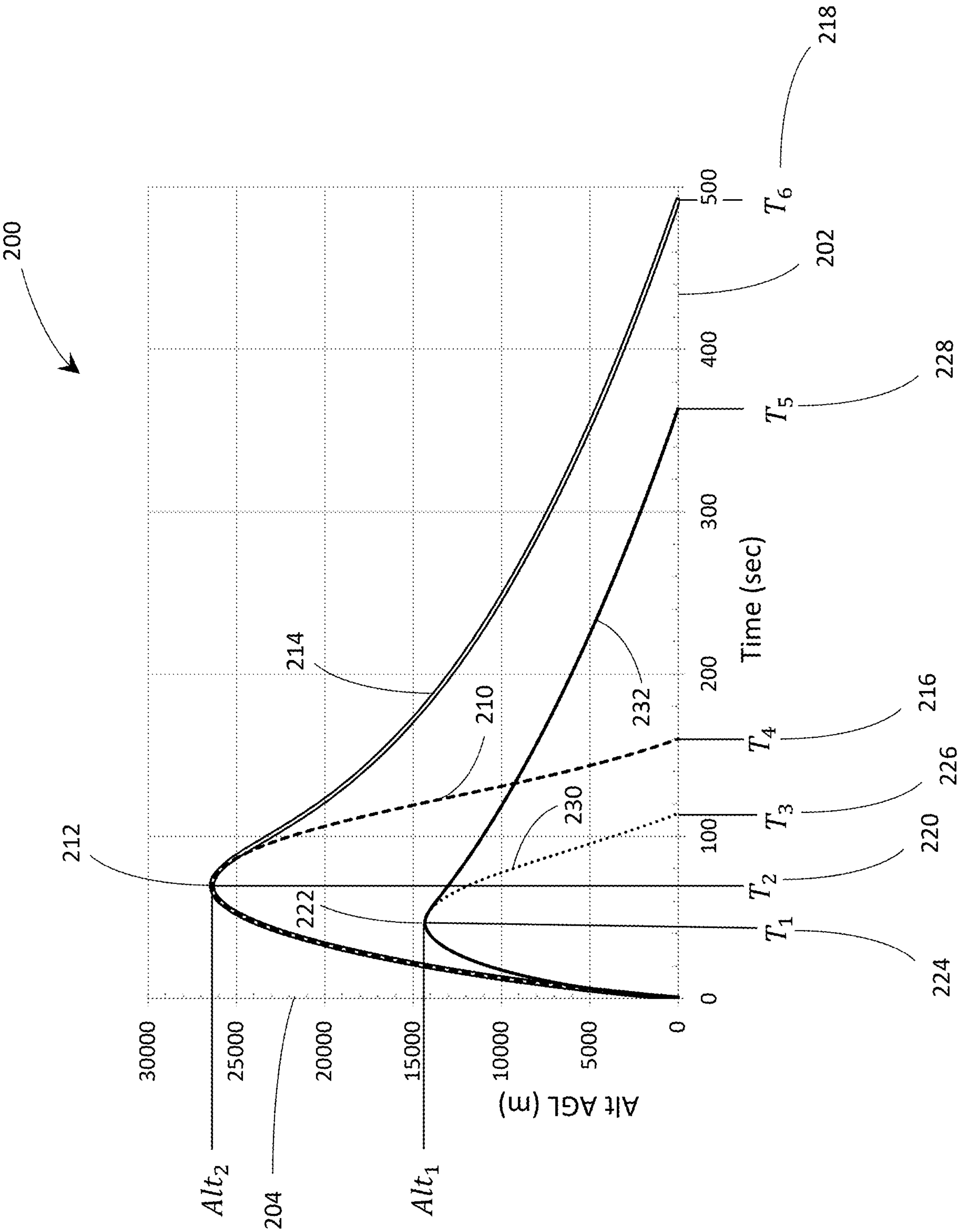
FIG. 4 illustrates a graph showing the altitude profile for the flight of particular vertically-launched rounds.
Figure 5:
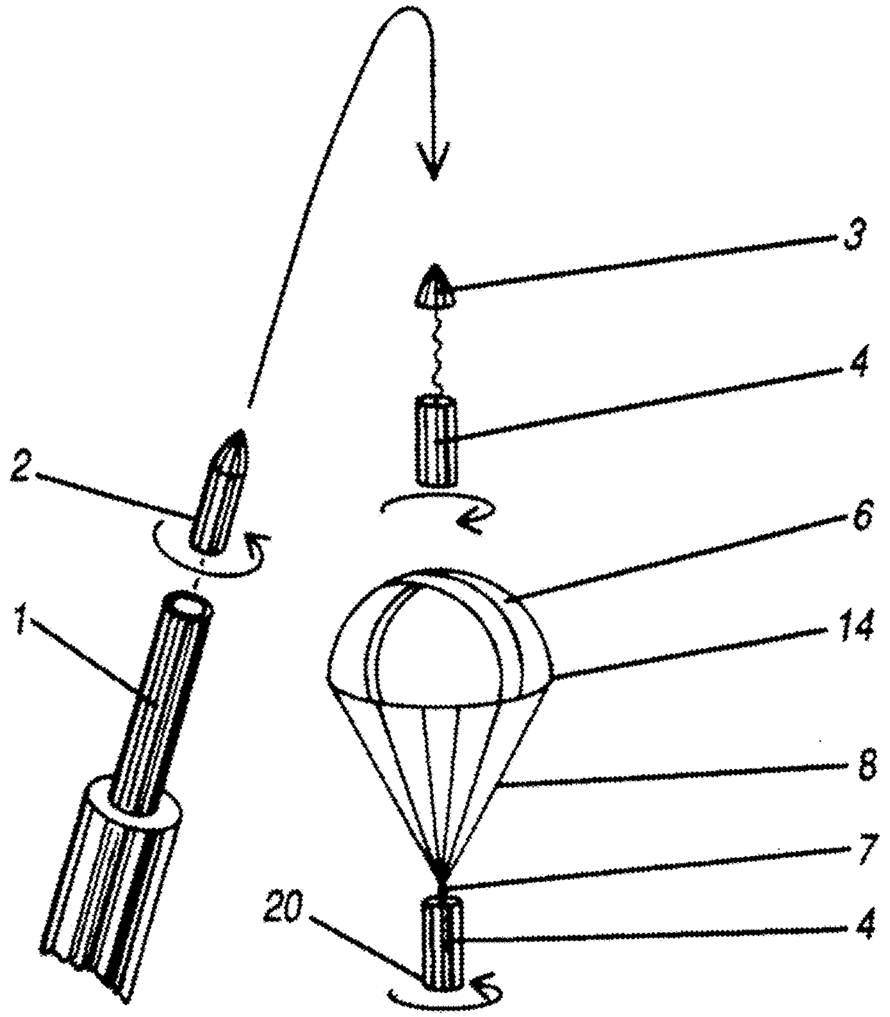
FIG. 5 Illustrates a schematic side view of the operation of a nose-deployed parachute recovery system according to known prior art.

Referring now to FIG. 4, illustrated is a graph 200 showing the altitude profile for the flight of particular vertically-launched rounds. The altitude profiles on graph 200 are plotted as time after firing, in seconds(s), on the horizontal independent x-axis 202, and altitude or height above ground level (AGL), measured in meters (m), on the vertical dependent y-axis 204. The base case is shown as dashed profile line 210, a spotter round being an archetypical unguided munition without activating a recovery system such as HPSRS 106, and the spotter round matching, as closely as practicable, the characteristics of the testing launch package 100. This profile line 210 sets the base case for apogee altitude 212 (Alt_2) of a spotter round. A precise measurement of flight package apogee 212 is used to establish the timing of the HPSRS 106 deployment, which may take into account, inter alia, the particular meteorological considerations on the time and date of the test firing. In this particular occasion, Alt_2 apogee 212 was measured between approximately 26 and 27 km at time T_2 220 of approximately 70 seconds after launch. Profile line 210 further shows the test package returning to ground at time T_4 216 of approximately 160 seconds.

With a precise observation of flight package 100 apogee altitude 212 from the spotter round, the time from firing to apogee 212 is used to set the deployment fuze 120 of the HPSRS 106. Ideally, the deployment fuze 120 will fire just after the flight package 100 reached apogee 212, i.e., while the flight package 100 is descending slowly, yet maintaining orientation resulting from the spin-based gyroscopic effects imparted by the cannon barrel upon firing. Approximately 5 seconds post-apogee 212 is considered adequate and effective, though not exclusive. Double line 214 on graph 200 depicts the firing and descent under canopy of a launch package 100 that specifically lacks any drag-enhancing features such as the drag element 122 or anything like it. Accordingly, the launch package 100 represented by double line 214 reaches the same apogee 212 as the projectile represented by profile line 210 at the same time T_2 220. However, this test flight package 100 will descend under the canopy of parachute 112 to a recoverable landing at time T_6 218 of approximately 490 seconds. Therefore, the parachute 106 and particularly the bearing assembly 130 must successfully function while the payload 104 spins at a rate on the order of 300 Hz, for the duration of period T_6 218-T_2 220, in this case approximately 420 s, or about 7:00 minutes.

The graph 200 depicted in FIG. 4 also shows the altitude profile represented by dotted line 230 for yet another shell including a more particular embodiment of the HPSRS 106, this embodiment having a circumferential drag element 122. As with the previously discussed test, a test round is fired without the HPSRS 106 active. Accordingly, an apogee Alt_1 222, a height of approximately 14,400 m AGL is observed, which occurs at time T_1 224 of about 45 seconds post-launch. This first test launch package 100 will fall to ground under its own accord at time T_3 226 of about 110 seconds post-launch. Notably, the embodiment of HPSRS 106 including the drag element 122 considerably limits the height of apogee 222, which is measured at between about 14 and 15 km.

Once again, as with the prior embodiment, the time t_1 224 of apogee 222 is used to set the timing of deployment fuze 120 detonation to deploy the HPSRS 106. With a fully functional and activated HPSRS 106, the deployment fuze 120 will deploy the parachute 106 shortly after apogee 222. As indicated by the solid line 232, the payload 104 will thereafter descend to a soft landing under canopy, that landing occurring at time T_5 228 of about 365 seconds post-launch. The HPSRS 106 will operate to lower the payload 104 under canopy for the duration of period T_5 228-T_1 224, in this case approximately 325 s, or about 5:25.

It will be seen that the use of the drag element 122 reduces the apogee height Alt_1 of apogee 222 by increasing the longitudinal drag on the launch package 100 during the ascent of the launch package 100 to the apogee 222. The apogee height Alt_1 of apogee 222 is about 12 km lower compared with Alt_2 apogee 212, a reduction of roughly 45%. As a consequence of the lower deployment of the HPSRS 106 and its parachute 112, the time that the payload 104 descends under the canopy of parachute 112, during which time the bearing assembly 130 must function to decouple the gyroscopically spinning payload 104 from the parachute 106, is reduced from about 420 seconds to about 325 seconds, a reduction of over 20%. This reduced duty cycle on the bearing assembly 130 reduces the buildup of friction and heat in the bearings 132, 134, reducing the likelihood of a bearing failure. Such bearing failure would lead with great probability to separation or collapse of the parachute 106, and damage or destruction of the payload 104. The likelihood that the bearing assembly 130 will function normally until the payload 104 safely lands is greatly improved.

The drag element 122 also has an additional function and benefit. The drag element 122 operates longitudinally in both directions of travel by the launch package 100. In the exemplary embodiment of the HPSRS 106 depicted in FIGS. 1-3, the drag element 122 is attached to the ogive 108, i.e., forward of a center of gravity 148. The forward direction is defined as the launch package 100 is fired from the cannon, i.e., towards the nose 110 along the longitudinal axis 126. The launch package 100 will generally maintain its orientation in three-dimensional space, owing to the gyroscopic spin stabilization imparted upon being fired from the rifled cannon.

Therefore, after reaching its apogee 222, the launch package 100 will begin to move downward, while still generally maintaining its orientation in three-dimensional space. Accordingly, following this reversal of direction, the drag element 122 in the free flow of the surrounding airstream exerts a stabilizing effect on the launch package 100, in the direction of the nose 110 along the longitudinal axis 126. The force imparted by the drag element 122 would tend to keep the launch package 100 aligned with the longitudinal axis 126. This maintenance of alignment with the longitudinal axis 126 limits the lateral forces placed upon the bearing assembly 130, and its bearings 132, 134 as the payload 104 spins. This reduced loading on the bearing assembly 130 reduces the buildup of friction and heat in the bearings 132, 134, reducing the likelihood of a bearing failure. Such bearing failure would lead with great probability to separation or collapse of the parachute 106, and damage or destruction of the payload 104. The likelihood that the bearing assembly 130 will function normally until the payload 104 safely lands is still further greatly improved.

The present disclosure has been described herein with reference to certain exemplary and/or preferred embodiments. These embodiments are offered as merely illustrative, and not limiting, of the scope of the present disclosure. Certain alterations or modifications may be apparent to those skilled in the art, in light of instant disclosure, without departing from the spirit or scope thereof. For example, although particular sizes, dimensions and/or calibers may be discussed at certain points herein with respect to exemplary embodiments of the present disclosure, the features disclosed herein will be seen by those skilled in the art as readily applicable to other sizes, caliber, and systems of fire. The full scope of Applicant's invention is defined solely with reference to the following appended claims.

Table of recited elements and reference numerals:

| | |
|---|---|
| 1 | Rifled cannon |
| 2 | Projectile |
| 4 | Base |
| 5 | Parachute assembly |
| 6 | Canopy |
| 8 | Suspension lines |
| 9 | Threaded section |
| 11 | Fuze assembly |
| 14 | Main parachute |
| 15 | Rotary bearing |
| 20 | Payload |
| 26 | Expulsion charge |
| 30 | Parachute module |
| 100 | Launch package |
| 102 | Driving band |
| 104 | Payload |
| 106 | High Performance Soft Recovery System (HPSRS) |
| 108 | Ogive |
| 110 | Nose |
| 112 | Parachute |
| 114 | Forward opening |
| 116 | Riser lines |
| 118 | Central pin |
| 120 | Fuze |
| 122 | Drag element |
| 124 | Flange |
| 126 | Longitudinal axis |
| 128 | Tether |
| 130 | Bearing assembly |
| 132 | Forward taper bearing |
| 132a | Forward taper bearing inner race |
| 132b | Forward taper bearing outer race |
| 132c | Forward taper bearing roller set |
| 134 | Aft taper bearing |
| 134a | Aft taper bearing inner race |
| 134b | Aft taper bearing outer race |
| 134c | Aft taper bearing roller set |
| 136 | Deformable spacer |
| 140 | Setback plate |
| 142 | Limit collar |
| 144 | Through opening |
| 146 | Drag element base |
| 148 | Center of gravity |
| 150 | Pressurization charge |
| 152 | Dimension, cannon bore |
| 200 | Graph |
| 202 | Independent x-axis |
| 204 | Dependent y-axis |
| 210 | Dashed line |
| 212 | Apogee (Alt_2) |
| 214 | Double line |
| 216 | T_4 |
| 218 | T_6 |
| 220 | T_2 |
| 222 | Apogee (Alt_1) |
| 224 | T_1 |
| 226 | T_3 |
| 228 | T_5 |
| 230 | Dotted line |
| 232 | Solid line |

The invention claimed is:

1. A ballistic projectile recovery system comprising:

a generally forward-facing opening in an ogive of the projectile which is selectively opened to deploy at least a portion of the recovery system;

a parachute deployable through the forward-facing opening, and connected to the projectile by one or more riser lines;

a rotational bearing assembly oriented coaxially with a longitudinal axis of the projectile, the one or more riser lines being rotationally decoupled from the projectile through the rotational bearing assembly; and a bidirectional drag inducing element extending externally of an ogive of the projectile.

2. The ballistic projectile recovery system according to claim 1, further comprising:

the bidirectional drag inducing element being rigidly affixed to the ogive of the projectile.

3. The ballistic projectile recovery system according to claim 1, further comprising:

the bidirectional drag inducing element being extensible radially beyond the caliber of the projectile.

4. The ballistic projectile recovery system according to claim 1, further comprising:

the bidirectional drag inducing element being continuous around a circumference of the projectile.

5. The ballistic projectile recovery system according to claim 1, further comprising:

the rotational bearing assembly having first and second taper bearings, the first taper bearing being oriented in an opposite longitudinal direction from the second taper bearing.

6. The ballistic projectile recovery system according to claim 1, further comprising:

bidirectional drag inducing element being connected with the projectile forward of a center of gravity of the projectile.

7. A ballistic projectile recovery system comprising:

a generally forward-facing opening in an ogive of the projectile which is selectively opened to deploy at least a portion of the recovery system;

a parachute deployable through the forward-facing opening, and connected to the projectile by one or more riser lines;

a rotational bearing assembly oriented coaxially with a longitudinal axis of the projectile, the one or more riser lines being rotationally decoupled from the projectile through the rotational bearing assembly; and a spacer deformable in at least the longitudinal direction of the projectile is provided between a setback plate and the rotational bearing assembly.

8. The ballistic projectile recovery system according to claim 7, wherein the spacer comprises one or more spring washers.

9. The ballistic projectile recovery system according to claim 7, further comprising the setback plate being movable between a first position wherein the spacer is uncompressed, to a second position made available to the setback plate by the compression of the spacer;

in the second position of the setback plate the setback plate is in contact with the projectile, thereby providing a load path that avoids the rotational bearing assembly to take up strain applied to the projectile in at least the longitudinal direction.

10. The ballistic projectile recovery system according to claim 9, wherein the rotational bearing assembly has at least one outer race affixed to a fixture of the ballistic projectile recovery system, the second position of the setback plate places the setback plate in contact with the fixture of the ballistic projectile recovery system.

11. The ballistic projectile recovery system according to claim 7, wherein the one or more riser lines are connected to the rotational bearing assembly via a rotary pin, the spacer being disposed around the rotary pin.

12. The ballistic projectile recovery system according to claim 11, wherein the rotary pin is engaged with the rotational bearing assembly by a press fit.

13. The ballistic projectile recovery system according to claim 7, further comprising:

the rotational bearing assembly having first and second taper bearings, the first taper bearing being oriented in an opposite longitudinal direction from the second taper bearing.

* * * * *